Jan. 18, 1949.   R. H. FASH ET AL   2,459,512
PETROLEUM EXPLORATION BY SOIL ANALYSIS
Filed Nov. 6, 1944
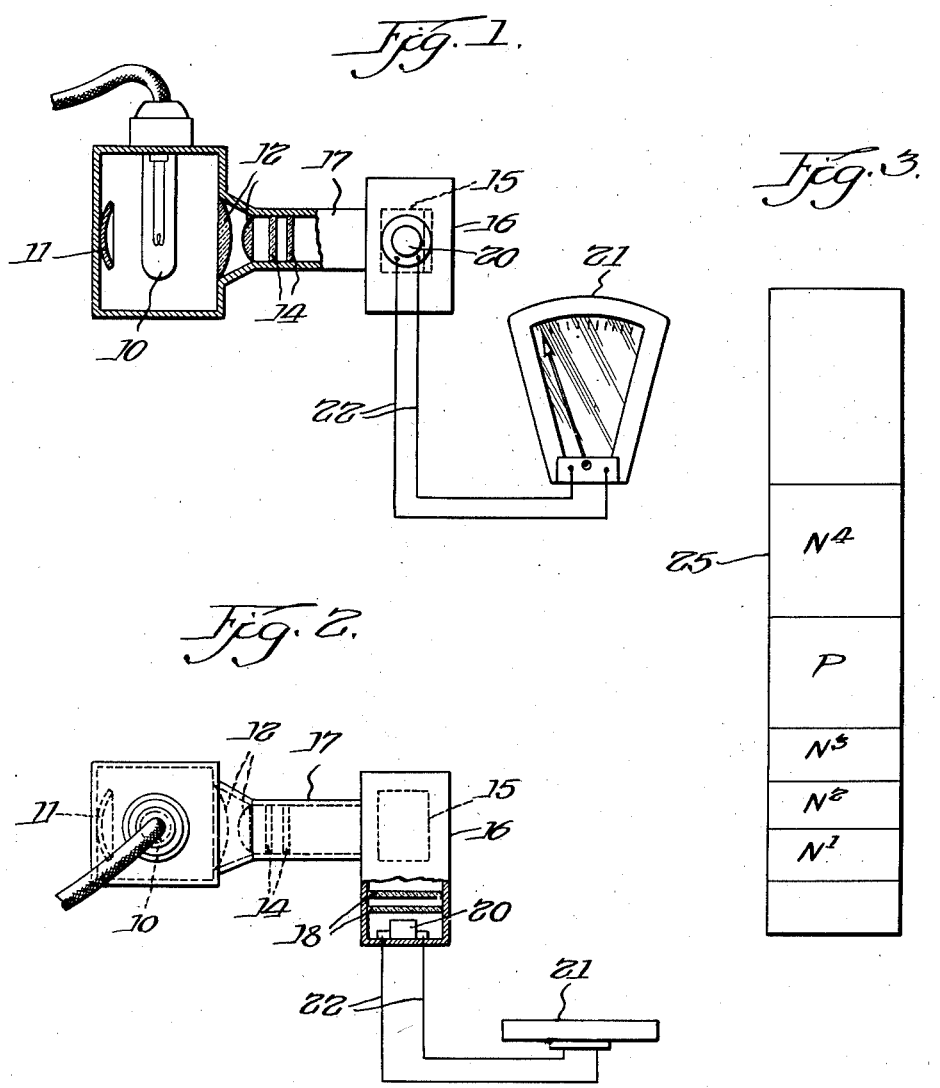
Inventors:
Ralph H. Fash, &
John G. Campbell:
By: Wilkinson Hurley Byron + Knight.
Attys Patented Jan. 18, 1949

2,459,512

UNITED STATES PATENT OFFICE 2,459,512

PETROLEUM EXPLORATION BY SOIL ANALYSIS

Ralph H. Fash, Fort Worth, and John G. Campbell, Houston, Tex., assignors to Ralph H. Fash, trustee, Fort Worth, Tex.

Application November 6, 1944, Serial No. 562,238

17 Claims. (Cl. 250—71)

This invention relates to an oil exploration method utilizing the analysis of earth material samples for petroleum oil content, and by the term "earth material" as used herein, we mean both land and water. The principal object of the invention is to provide an exploration method of greatly increased accuracy and sensitivity and according to which analyses can be rapidly carried out.

In processes heretofore proposed the accuracy of the analysis as to petroleum oil content has been impaired by the inability to eliminate the interfering effect of non-petroleum substances which cannot be distinguished from the effect of the petroleum oil in the testing procedure used. For example, in the patent to Campbell, Re. 22,081, of April 28, 1942, the earth sample is extracted by means of an oil solvent, and the extract is subjected to fluorescigenous radiation (for example, ultra-violet light), and the fluorescent effect is measured. However this fluorescent effect is a compound of the fluorescent effects of petroleum and of fluorescent non-petroleum substances whose proportions are unknown. Consequently, while a useable index of the oil content is secured, the index is not as accurate as could be desired.

In accordance with the present invention, this inaccuracy is substantially eliminated by the substantial elimination of the interfering effect of the non-petroleum substances, specifically the fluorescent non-petroleum substances, since in accordance with the preferred practice of the present invention, analysis is effected by the application of fluorescigenous radiation.

Briefly stated, in the practice of the present invention we secure a measured sample of earth material and, as above stated, this may be soil or it may be water from streams, lakes or wells. Utilizing an oil solvent, the petroleum and such non-petroleum substances as are soluble in the solvent are extracted. Thereupon the petroleum and non-petroleum components in the extract are substantially separated by a separating procedure which for the best results utilizes preferential adsorption. Either one of the separated components can then be used for the derivation of an index of the oil content of the sample, but in the best practical procedure, the separated petroleum component is used in obtaining the index.

The earth material sample may be a surface sample, i. e. one derived from or at a shallow depth below the actual surface, which depth will depend somewhat upon the nature of the area which is being explored. Ordinarily, the depth of derivation can be five or six feet or thereabouts, although in some cases, for example, in a particularly arid area, we may go considerably deeper for the so-called surface sample. The invention is, of course, applicable in explorations at any depth, for example, in the evaluation of the oil content of well cuttings and drilling fluid, the latter also being an earth material as herein contemplated.

In a number of methods for detecting subterranean oil deposits the hydrocarbon gases from the soil samples taken near the surface of the earth are analyzed for constituents related to the deposits sought. These methods of prospecting, based on gas analysis of leakage products from buried deposits, have been used, notwithstanding some difficulties which are inherent in the methods themselves. In exploring for petroleum oil such methods leave much to be desired since it is difficult to distinguish a natural gas field from a petroleum field or other source of hydrocarbon.

In the method disclosed in the above identified Campbell reissue patent the petroleum content of earth samples is quantitatively determined by making use of the phenomenon that petroleum oil has a fluorescent appearance under ultra-violet light, and herein ultra-violet light will be referred to as a convenient example of fluorescigenous radiation, without limiting intent. Drill cuttings, cores or other earth samples are first treated with an oil solvent to extract the oil from the earth sample and the oil content of the extract is then measured by subjecting the said solution to ultra-violet light to cause the oil content thereof to fluoresce. The intensity of the fluorescent effect is in direct proportion to the oil content of the extract and by measuring the intensity of the fluorescence a quantitative determination can be made of the petroleum oil contained in the extract and thus of the oil content of the earth sample.

A further object of the invention is to provide improvements whereby the usefulness of the basic method of Campbell can be greatly increased by eliminating the error produced by substances other than petroleum which fluoresce when subjected to fluorescigenous radiation.

In subjecting the extract to ultra-violet light to produce the fluorescent effect in accordance with the method of said patent, it has been observed that the intensity of the fluorescence is in some cases masked by the fluorescent effect of organic compounds resulting from the decomposition of organic debris. This masking effect may prevent the detection of oil pools by reason of the fact that the procedures given in said reissue patent determine the combined intensity of the fluorescence due to petroleum oil in addition to the fluorescence caused by said organic compounds other than petroleum. It therefore follows that if it were possible to separate the other than petroleum fluorescent-producing compounds present in the extract obtained from the earth samples from the petroleum constituents of said extracts the usefulness of the basic method could be greatly increased.

A further object of the present invention is to provide an improved method wherein the principles of preferential adsorption are employed in effecting the separation of petroleum from the non-petroleum fluorescent-producing compounds that may be present in extracts obtained from earth samples.

With these and various other objects in view the invention may consist of certain novel features which will be more fully described and particularly pointed out in the specification, drawings and claims appended hereto.

In the drawings, which illustrate apparatus for use in carrying out the improved method, Figure 1 is a side elevational view illustrating an instrument for subjecting extracts or other solutions to ultra-violet light and measuring the intensity of the fluorescence produced;

Figure 2 is a top plan view of the instrument shown in Figure 1; and

Figure 3 is a view illustrating a separation method employing the principles of preferential adsorption using filter paper.

After the solid earth sample to be analyzed has been secured, a weighed quantity, approximately fifty grams, is taken from said sample and the same is then extracted by using any suitable oil solvent, such as ethyl ether or a combination of solvents may be employed. For example, in the extraction process benzene may be used as the oil solvent for effecting the extraction together with a water miscible substance having a solvent action on petroleum oil such as acetone. The water miscible substance has the effect of facilitating the extraction of the petroleum oil from the earth samples. The principles underlying the selection of the solvent are fully explained in our Patent No. 2,367,664, granted January 23, 1945.

For said extraction process the fifty grams of earth are placed in an eight-ounce glass-stoppered bottle containing five glass marbles approximately one-half inch in diameter, together with 150 ccs. of a mixture of 20% acetone and 80% water by volume and 40 ccs. of benzene which preferably does not fluoresce when subjected to ultra-violet light. It may be mentioned here that if a solvent which is fluorescent is used, correction can easily be made, or the fluorescent effect thereof merely allowed for. The bottle is then mechanically agitated, end over end, for approximately twenty-four hours. This treatment results in disintegrating and dispersing the earth sample while simultaneously the benzene-soluble constituents are extracted. The bottle and contents are then centrifuged for approximately three minutes to separate the solvent from the aqueous layer.

The volume of the solvent layer comprising the extract is then read and the intensity of the fluorescence of the extract under fluorescigenous radiation, e. g. ultra-violet light is measured by using any standard equipment such as that shown in the drawings for measuring the fluorescence of liquids and solvents. Referring now to the drawings, the exciting light source 10 may consist of a mercury capillary arc with a reflector 11 being located to the rear of the light source and a condensing lens system 12 being located in front. The filters 14 filter out all significant light to the container or cuvette 15 located in the housing 16 at the end of the metal tube 17. It will be understood that one side of the housing can be removed for the introduction and withdrawal of the containers for the various extracts from the earth samples being analyzed. The fluorescent light from each extract will pass through the special filters 18 to the photo-electric cell 20 connected in circuit with the galvanometer 21, by the wires 22. The fluorescent light striking the photo-electric cell results in a flow of current to the galvanometer proportional to the intensity of the fluorescent effect. To calibrate the instrument it is only necessary to test standard solutions wherein the content of the fluorescent-producing substances is known.

Having obtained a reading from the galvanometer indicating the content for said extract as regards fluorescent-producing substances, it is then necessary, in order to obtain an index as to the petroleum oil contained in said extract, to make use of the improvements of this invention by which it is possible to determine with fair accuracy just what proportion of the total fluorescent effect is caused by organic compounds other than petroleum oil.

One procedure which we have found satisfactory is described below, and since it is merely explanatory of the invention, it should not be considered as limiting. Said procedure makes use of the adsorption properties of certain materials for separating a complex mixture into its constituents.

About 25 ccs. of the solvent extract of the earth sample is taken from the above described glass-stoppered bottle and the same is placed in a one-ounce jar together with about one gram of an adsorbent which may comprise the California Chemical Company's adsorbent No. 2641. The one-ounce jar is stoppered and vigorously shaken for about five minutes. Following this agitation of said mixture the jar is centrifuged to separate the extract from the adsorbent and the fluorescence of the extract is again determined by subjecting the same to ultra-violet light in apparatus as previously described. While the adsorbent will retain some of the petroleum, the adsorbent will retain mainly the non-petroleum constituents of the material extracted from the earth sample. Therefore the last reading indicating the fluorescence of the extract following treatment of the same with the adsorbent will be lower than the first reading, since said first reading is a measurement of the total fluorescence of the extract and which fluorescence is that produced by petroleum oil in the extract in addition to that produced by other than petroleum fluorescent-producing substances.

In the use of California Chemical Company's adsorbent No. 2641, we have found that about 25% of the petroleum present in the extract is removed, while about 75% of the non-petroleum fluorescent producing substances are removed. Using these figures, the amount of petroleum in the extract can be calculated from the following formula:

$$X = 2B - .5A$$

in which $X$ is the amount of petroleum, $A$ is the intensity of the fluorescent effect of the original extract, and wherein $B$ is the intensity of the fluorescent effect of the extract after treatment with the adsorbent.

The galvanometer readings may be used directly for $A$ and $B$ or they may be calculated as micrograms of oil. Knowing the volume of the extract, the amount of petroleum in the extract, and the weight of the earth sample, the parts per million or billion of oil in the earth sample can be calculated.

We have found that California Chemical Company's adsorbent No. 2652 is also satisfactory. The percent of petroleum retained by this adsorbent is about 30%, while about 85% of the non-petroleum fluorescent-producing substances are retained. Other adsorbents may be used after determining the percent retention of petroleum and fluorescent-producing non-petroleum constituents. The adsorbents herein identified as No. 2641 and 2652 are essentially magnesium oxides. Other adsorbents that may be used in the practice of the present invention are calcium oxide, aluminum oxide, silica gel and activated carbon. Still other adsorbents or a combination of adsorbents may be used, provided they have the desired characteristics.

The procedure we have found to be satisfactory for determining the retention properties of an adsorbent with respect to petroleum and fluorescent-producing non-petroleum constituents is as follows:

A stock solution of non-petroleum substances such as is contained in high organic content soil is obtained by extracting petroleum-free soil in the manner described herein for extracting the various earth samples. It is desirable to have at least two liters of such an extract on hand before beginning the tests to determine the adsorbent characteristics of an adsorbent. A stock solution of crude petroleum is similarly prepared, the amount of petroleum being that which will give approximately the same fluorescence as is produced by the petroleum-free soil extract when each solution is subjected to equivalent ultra-violet light. After measuring the intensity of the fluorescent effect for each solution, about 25 ccs. of each solution is placed in separate one-ounce jars, each jar containing about one gram of the adsorbent being tested. Both jars are then capped securely and shaken for about five minutes. The jars are then centrifuged to separate the adsorbent from its respective solution since as a result of the centrifuging step the adsorbent is caused to settle to the bottom of the jar.

In one jar the liquid above the adsorbent will comprise the extract obtained by treating petroleum-free soil having a high content of fluorescent-producing substances. In the other jar above the adsorbent the liquid will comprise the crude petroleum solution. The said liquids will have been uniformly subjected to equal quantities of the same adsorbent. The action of said adsorbent on the extract containing only non-petroleum fluorescent-producing substances can therefore be compared with its action on the solution containing only petroleum. This requires that the liquids be again subjected to ultra-violet light and the fluorescence of each measured. Therefore, about 15 ccs. of each liquid is taken from its respective jar and placed in individual containers or cuvettes and then subjected to ultra-violet light, the resulting fluorescent effect in each case being measured. From the intensities of the fluorescent effect before and after treatment with the adsorbent, the percent of retention of the fluorescent-producing substances for each liquid can be calculated.

In following the above procedure using California Chemical Company's adsorbent No. 2641, the results correspond to the constants .75 and .25 which were used in deriving the formula for said adsorbent, namely, $X$ is equal to $2B$ minus $.5A$. A new formula will have to be calculated for each adsorbent since the same will have different adsorbent characteristics and different constants will be obtained. The following can be used in deriving the formula for each adsorbent:

$$X = \frac{B - DA}{C - D}$$

wherein, $X$ equals the amount of petroleum, $A$ is the intensity of the fluorescent effect of the original extract of the earth sample, $B$ is the intensity of the fluorescent effect of the extract after treatment with the adsorbent, $C$ is the percent of petroleum in the petroleum solution following treatment by the adsorbent, and wherein $D$ is the percent of non-petroleum fluorescent-producing substances in the petroleum-free soil extract after treatment by the adsorbent.

In using the constants above derived for No. 2641 adsorbent, it will be seen that $C$ is equal to 1.00 minus .25 or .75 and that $D$ is similarly computed to be .25. Then substituting in the said formula $$X = \frac{B - .25A}{.75 - .25}$$
$$= \frac{B - .25A}{.50}$$

or $$X = 2B - .5A.$$

The adsorbent having optimum characteristics for this work should adsorb only a small quantity of petroleum, whereas, it should adsorb a major portion of the fluorescent-producing non-petroleum substances. A proof test of the results is to mix the petroleum solution with the soil extract in known ratios and determine the quantity of the petroleum in each mixture using said formula.

In the formula $$X = \frac{B - DA}{C - D}$$

$D$ represents the percent of fluorescent-producing non-petroleum constituents remaining in the extract after treatment with the adsorbent. Experience has shown that $D$ varies with the age of the earth sample and the type of non-petroleum organic matter present. Since in areas being explored, petroleum is probably present, the $B$ reading contains not only some of the non-petroleum constituents but also the petroleum constituents. It will be noticed that the expression "$C-D$" for any given adsorbent can be considered as a constant and, therefore, the expression can be simplified to read "$X = B - DA$." If there were no petroleum present, then $B - DA = 0$, from which $$D = \frac{B}{A}$$

By substituting the values of $B$ and $A$ in this last equation, a series of values of $D$ are obtained for any given area. Since the high values thus obtained must of necessity contain petroleum, these high values are discarded and an approximate average value of the low $D$ results are used for substitution in the equation $X=B-DA$. Since D as thus obtained is only an approximation, some of the results for X are less than 0. In plotting the values on graph paper, this does not cause any confusion, since the high values of X will locate the oil pool.

It is evident that where there are considerable variations in the non-petroleum fluorescent content of the samples, the formula must be used for accurate results. However, where the non-petroleum fluorescent content of the samples is fairly constant, the B reading, taken alone, will be a useable index of the oil content of the sample, being less affected than the A reading by variations in the non-petroleum fluorescent content.

In case water is the earth material to be tested, the procedure is the same as above described except that the pulverizing step is, of course, unnecessary and a larger volume of the earth material is used. According to a typical procedure, 50 ccs. of solvent (15 parts of benzene to 4 of acetone) are introduced into a 2000 cc. glass-stoppered volumetric flask. The flask is then filled to the mark with the sample of water and vigorously shaken for five minutes. After the settling, the intensity of the fluorescent effect of the extract is determined by subjecting it to ultra-violet radiation. Then 25 cc. of the extract are placed in a one-ounce glass-stoppered bottle, one gram of the adsorbent is added and the bottle is shaken vigorously for about 20 minutes. The extract is then clarified by centrifuging to segregate the adsorbent from the extract, and the intensity of the fluorescence of the resultant extract is determined in the above mentioned manner by subjecting it to ultra-violet radiation. Calculations may then be made in the manner hereinbefore described to arrive at the index of the petroleum content of the water sample.

Another method of separation employing the principles of preferential adsorption which we have used is to suspend the lower end of a strip of filter paper in the extract of one of said earth samples which it is desired to analyze for its petroleum oil content. The filter paper is not removed from the extract until the latter is completely absorbed by the filter paper followed by a developing process effected by adding a small quantity of the original solvent to the container, permitting this solvent to be absorbed by the filter paper strip, which action separates the extract components into individual bands. Then by subjecting the filter paper to the action of ultra-violet light, the petroleum will be found to be mainly concentrated in one portion of the strip, the non-petroleum constituents are not fluorescent or only slightly so under these conditions, whereas, the petroleum is fluorescent. Referring to the drawings, Figure 3 shows a strip of filter paper 25 which has been immersed in a vertical position with its lower end in the extract, the extract travelling up the filter paper by capillarity and producing the bands or zones $N'$, $N^2$, $N^3$, P and $N^4$ by adsorption. The number of bands and their position on the filter paper varies with the type of material in solution in the extract. In the filter paper strip 25, which is illustrative of an actual test, band P represents the petroleum constituents in the extract. The oil-containing portion of the filter paper is then cut from the strip and the same is subjected to an extraction process to extract the oil. This new extract is then subjected to ultra-violet light and the fluorescence measured. This result can be taken as an index of the oil content. From this reading it is also possible to calculate the oil content of the said earth sample.

During the time the filter paper is suspended in the extract, the solvent will travel up the filter paper and evaporate therefrom, leaving the material extracted from the earth sample concentrated in one band which is subsequently separated into individual bands comprising the various components of the soil extract by the developing process previously described. Thus all the material extracted from the earth is finally in the filter paper after the evaporation of the solvent. The positions of the different substances vary and it is this variation in position that enables us to separate the oil from the non-petroleum constituents. Thus when the portion of the filter paper which contains the petroleum is cut from the remainder of the filter paper and this oil containing portion is extracted by using a solvent, the oil that was originally contained in the extract will be in this new extract but the new extract will be substantially free from non-petroleum constituents which might cause trouble. Thus the determination of the oil content of this new extract will give the petroleum content of the earth sample. Knowing the volume of the new extract and the oil content as determined by the intensity of the fluorescent appearance and the weight of the original earth sample, the oil content of the earth sample can be calculated. In order to obtain comparable indices for a number of earth samples, the volume of solvent used must be constant in the re-extraction step, or the volume known.

It will be understood that the procedure just described is equally applicable when the earth material is water, and the procedure for obtaining the extract may be the same as previously described.

Instead of directly obtaining the oil content index from the separated petroleum component, the index may be indirectly arrived at by testing the separated non-petroleum component. In the process utilizing the powdered adsorbent, the adsorbent and the adsorbed matter can be separated from the extract and the adsorbed matter desorbed, the intensity of its fluorescence measured, and the figure thus obtained subtracted from the original measurement to give an index of the oil content of the sample.

Similarly, in the process utilizing the strip of filter paper, the non-petroleum bands, instead of the petroleum band, may be extracted by the solvent, and the measurement of the fluorescent effect subtracted from a measurement of the fluorescent effect of the original extract to give an index of the oil content of the sample.

Where either of the above procedures is followed, due consideration of the volume of the extract obtained in comparison with the volume of the original extract must be considered in arriving at the index by subtracting the intensity of the fluorescent measurement of the new extract from the intensity of the fluorescent effect of the original extract.

Instead of filter paper, we may use a column of powdered adsorbent, the procedure varying, however, from that of the use of the filter paper in that the extract is poured through a column of adsorbent contained in a glass tube which permits the extract to pass from the tube after passing through the adsorbent. The various substances dissolved in the extract will form bands or strata in different portions of the column of the adsorbent. The bands of the different substances can be resolved from one another in the usual procedure of chromatography as by washing the column with fresh portions of the original solvent. The position of the band containing the petroleum component of the extract can be located by subjecting the column of adsorbent to fluorescigenous radiation. This band of adsorbent containing the petroleum constituents is separated from the remainder of the column and the petroleum dissolved out by means of an oil solvent. The extract thus obtained is subjected to fluorescigenous radiation and an index of the petroleum content of the earth material obtained. In order to have comparable indices for a number of earth material samples the volumes of the final extracts must be the same, or their volume known.

In the processes which have been described by way of example, separation is obtained by procedures involving stratification of the petroleum and non-petroleum constituents. In the first described process using a powdered adsorbent, after one of the components has been preferentially adsorbed, stratification can be effected by gravity alone, although it is preferable to use a centrifuge for the sake of speed. In the filter paper and adsorbent column processes, stratification occurs directly as the result of preferential adsorption.

Where the moisture content of the earth samples vary greatly, the moisture content of each sample should be determined and the oil content calculated to the same moisture basis to permit more accurate comparisons.

By taking earth samples over the area being explored, determining the petroleum content in the manner above described, and then plotting the results on a map of the area, the presence of an underground oil pool can be determined. While most earth samples will show the presence of some petroleum by this method, the area over an oil pool will be characterized by the fact that a majority of the earth samples in the area over the pool will have higher petroleum content than in the surrounding area.

This application is a continuation-in-part of our copending application Serial No. 467,092, filed November 27, 1942, now abandoned, and entitled Petroleum exploration by soil analysis.

We claim:

1. An oil exploration method which comprises extracting from a measured sample of earth material by a measured amount of an oil solvent the petroleum and such non-petroleum substances as are soluble in said solvent, effecting major separation of the non-petroleum component from the petroleum component in the extract by a separating procedure which includes the utilization of preferential adsorption, and arriving at an index of the petroleum content of the earth material sample by utilizing the residual soluble constituents in an extract containing them.

2. An oil exploration method which comprises extracting from a measured sample of earth material by a measured amount of an oil solvent the petroleum and such non-petroleum substances as are soluble in said solvent, effecting major separation of the petroleum component from the non-petroleum component in the extract by a separating procedure which includes the utilization of preferential adsorption, and deriving from the separated petroleum component an index of the oil content of the earth material sample.

3. An oil exploration method which comprises extracting from a measured sample of earth material by a measured amount of an oil solvent the petroleum and such fluorescent non-petroleum substances as are soluble in said solvent, effecting major separation of the petroleum component from the non-petroleum component in the extract by a separating procedure which includes the utilization of preferential adsorption, and subjecting the separated petroleum component to fluorescigenous radiation to obtain an index of the oil content of the earth material sample.

4. An oil exploration method which comprises extracting from a measured sample of earth material by a measured amount of an oil solvent the petroleum and such fluorescent non-petroleum substances as are soluble in said solvent, subjecting the extract to fluorescigenous radiation and measuring the intensity of the fluorescent effect, effecting major separation of the petroleum component from the non-petroleum component in said extract by a separating procedure which includes the utilization of preferential adsorption, subjecting the separated petroleum component to fluorescigenous radiation and measuring the intensity of the fluorescent effect, and then deriving an index of the petroleum content of the sample utilizing the difference in the intensity of the two fluorescent effects.

5. An oil exploration method which comprises extracting from a measured sample of earth material by a measured amount of an oil solvent the petroleum and such fluorescent non-petroleum substances as are soluble in said solvent, subjecting the extract to fluorescigenous radiation and measuring the intensity of the fluorescent effect, effecting major separation of the petroleum component from the non-petroleum component in said extract by a separating procedure which includes the utilization of preferential adsorption, subjecting the extract containing the separated petroleum component to fluorescigenous radiation and measuring the intensity of the fluorescent effect, and then deriving an index of the petroleum content of the sample utilizing the difference in the intensity of the fluorescent effect of the extract before and after treatment with the adsorbent.

6. An oil exploration method which comprises extracting from a measured sample of earth material by a measured amount of an oil solvent the petroleum and such fluorescent non-petroleum substances as are soluble in said solvent, subjecting the extract to fluorescigenous radiation and measuring the intensity of the fluorescent effect, effecting major separation of the petroleum component from the non-petroleum component in said extract by a separating procedure which includes the utilization of preferential adsorption, subjecting one of the separated components to fluorescigenous radiation and measuring the intensity of the fluorescent effect, and then deriving an index of the petroleum content of the sample utilizing the difference in the intensity of the two fluorescent effects.

7. An oil exploration method which comprises extracting from a measured sample of earth material by a measured amount of an oil solvent the petroleum and such fluorescent non-petroleum substances as are soluble in said solvent, subjecting the extract to fluorescigenous radiation and measuring the intensity of the fluorescent effect, adding an adsorbent to said extract for adsorbing a major portion of the non-petroleum component, centrifuging to separate the petroleum component from the adsorbed non-petroleum component in said extract, subjecting the extract containing the separated petroleum component to fluorescigenous radiation and measuring the intensity of the fluorescent effect, and then deriving an index of the petroleum content of the same utilizing the difference in the intensity of the fluorescent effect of the extract before and after treatment with the adsorbent.

8. An oil exploration method which comprises extracting from a measured sample of earth material by a measured amount of an oil solvent the petroleum and such fluorescent non-petroleum substances as are soluble in said solvent, subjecting the extract to fluorescigenous radiation and measuring the intensity of the fluorescent effect, effecting major separation of the non-petroleum component from the petroleum component in said extract by a separating procedure which includes the utilization of a preferential adsorption agent whose approximate retention properties for both the petroleum and non-petroleum components are known, subjecting the extract containing the separated petroleum component to fluorescigenous radiation and measuring the intensity of the fluorescent effect, and then deriving an index of the petroleum content of the sample based on the difference in the intensity of the fluorescent effect of the extract before and after treatment with the adsorbent and on the retention properties of the latter.

9. An oil exploration method which comprises extracting from a measured sample of earth material by a measured amount of an oil solvent the petroleum and such fluorescent non-petroleum substances as are soluble in the solvent, subjecting the extract to fluorescigenous radiation and measuring the intensity of the fluorescent effect, effecting major separation of the non-petroleum component from the petroleum component in said extract by a separating procedure which includes the utilization of a preferential adsorption agent whose approximate retention properties for both the petroleum and non-petroleum components are known, subjecting the extract containing the separated petroleum component to fluorescigenous radiation and measuring the intensity of the fluorescent effect, and then deriving an index of the petroleum content of the sample by using the formula $$X = \frac{B-DA}{C-D}$$

wherein X is an index of the petroleum content of the sample, A is the intensity of the fluorescent effect of the original extract, B is the intensity of the fluorescent effect of the extract following separation, C is the percent of the petroleum remaining in the extract following separation, and D is the percent of the non-petroleum fluorescent substances remaining in the extract following separation.

10. An oil exploration method which comprises extracting from a measured sample of earth material by a measured amount of an oil solvent the petroleum and such fluorescent non-petroleum substances as are soluble in said solvent, treating the extract to effect major separation of the non-petroleum fluorescent component from the petroleum component in said extract, and subjecting the separated petroleum component to fluorescigenous radiation and measuring the intensity of the fluorescent effect as an index of the oil content of the earth material sample.

11. An oil exploration method which comprises extracting from a measured sample of earth material by a measured amount of an oil solvent and petroleum and such fluorescent non-petroleum substances as are soluble in said solvent, subjecting the extract to fluorescigenous radiation and measuring the intensity of the fluorescent effect, treating the extract to effect major separation of the non-petroleum fluorescent component from the petroleum component in said extract, subjecting the separated petroleum component to fluorescigenous radiation and measuring the intensity of the fluorescent effect, and then deriving an index of the petroleum content of the sample utilizing the difference in the intensity of the two fluorescent effects.

12. An oil exploration method which comprises extracting from a measured sample of earth material by a measured amount of an oil solvent the petroleum and such non-petroleum substances as are soluble in said solvent, utilizing preferential adsorption in effecting major separation by stratification of the petroleum component and the non-petroleum component in the extract, and utilizing the petroleum component stratum in the derivation of an index of the oil content of the earth material sample.

13. An oil exploration method which comprises extracting from a measured sample of earth material by an oil solvent the petroleum and such non-petroleum substances as are soluble in said solvent, separating the non-petroleum substances from the petroleum by preferential adsorption using an adsorption medium which retains the adsorbed substances in separate strata, separating the adsorbed petroleum stratum from the remainder and extracting the petroleum from said separated stratum by an oil solvent, and subjecting the last-obtained extract to fluorescigenous radiation to derive an index of the oil content of the sample.

14. An oil exploration method which comprises extracting from a measured sample of earth material by an oil solvent the petroleum and such non-petroleum substances as are soluble in said solvent, separating the non-petroleum substances from the petroleum by preferential adsorption using a filter paper strip which retains the adsorbed substances in separate strata, separating the adsorbed petroleum stratum from the remainder of the strip and extracting the petroleum from said separated stratum by an oil solvent, and subjecting the last-obtained extract to fluorescigenous radiation to derive an index of the oil content of the sample.

15. An oil exploration method which comprises extracting from a measured sample of earth material by a measured amount of an oil solvent the petroleum and such fluorescent non-petroleum substances as are soluble in said solvent, subjecting the extract to fluorescigenous radiation and measuring the intensity of the fluorescent effect, effecting major separation of the non-petroleum component from the petroleum component in said extract by a separating procedure which includes the utilization of preferential adsorption, subjecting the separated non-petroleum component to fluorescigenous radiation and measuring the intensity of the fluorescent effect, and deriving an index of the petroleum content of the sample by subtracting the last-mentioned measurement from the first.

16. The method which comprises extracting from a measured sample of earth material by a measured amount of oil solvent the petroleum and such non-petroleum substances as are soluble in said solvent, separating the non-petroleum substances from the petroleum by preferential adsorption using an adsorption medium which retains the adsorbed substances in separated strata, separating the adsorbed petroleum stratum from the remainder, and extracting the petroleum from said separated stratum by an oil solvent, whereby to produce a specimen substantially uncontaminated by non-petroleum solute and usable in deriving an index of the petroleum content of the earth material.

17. The method which comprises extracting from a measured sample of earth material by a measured amount of an oil solvent the petroleum and such non-petroleum substances as are soluble in said solvent, subjecting the extract to fluorescigenous radiation and measuring the intensity of the fluorescent effect, treating the extract to effect major separation of the non-petroleum fluorescent compound from the petroleum compound in said extract, subjecting the separated petroleum component to fluorescigenous radiation, and measuring the intenstiy of the fluorescent effect, whereby an index of the petroleum content of the sample may be obtained by utilizing the difference in the intensity of the two fluorescent effects.

RALPH H. FASH.
JOHN G. CAMPBELL.

REFERENCES CITED

The following references are of record in the file of this patent:

UNITED STATES PATENTS

| Number | Name | Date |
| --- | --- | --- |
| Re. 22,081 | Campbell | Apr. 28, 1942 |
| 2,305,082 | Hocott | Dec. 15, 1942 |
| 2,329,824 | Campbell | Sept. 21, 1943 |
| 2,337,443 | Blau | Dec. 21, 1943 |
| 2,337,465 | Heigl | Dec. 21, 1943 |

OTHER REFERENCES

"Chromatographic Adsorption Analysis," Harold H. Strain-Interscience Publishers, Inc., New York, N. Y., published 1942. (Copy in Div. 43.)

"Fluorochemistry," Jack De Ment, Chemical Publishing Company, Inc., Brooklyn, N. Y., published 1945. (Copy in Div. 3.)